US008650269B2

United States Patent
Nguyen et al.

(10) Patent No.: US 8,650,269 B2
(45) Date of Patent: *Feb. 11, 2014

(54) SYSTEM AND METHOD FOR ASSIGNING ADDRESSES TO INFORMATION HANDLING SYSTEMS

(75) Inventors: Cuong Nguyen, Austin, TX (US);
Michael A. Brundridge, Georgetown, TX (US); Bruce Holmes, Austin, TX (US); Michael Roberts, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2009 days.

This patent is subject to a terminal disclaimer.

(21) Appl. No.: 11/554,090

(22) Filed: Oct. 30, 2006

(65) Prior Publication Data
US 2008/0101351 A1 May 1, 2008

(51) Int. Cl.
*G06F 15/177* (2006.01)
*G06F 15/16* (2006.01)
*G06F 1/00* (2006.01)
*H04L 12/66* (2006.01)

(52) U.S. Cl.
USPC ............ 709/222; 709/218; 713/300; 370/352

(58) Field of Classification Search
USPC .................................................. 709/222–223
See application file for complete search history.

(56) References Cited

U.S. PATENT DOCUMENTS

| 6,928,478 | B1 | 8/2005 | Gangadharan | |
|---|---|---|---|---|
| 2003/0088655 | A1* | 5/2003 | Leigh et al. | 709/223 |
| 2003/0200399 | A1* | 10/2003 | Dawkins et al. | 711/152 |
| 2005/0138439 | A1* | 6/2005 | Rothman et al. | 713/300 |
| 2007/0067263 | A1* | 3/2007 | Husain et al. | 707/2 |
| 2008/0104243 | A1* | 5/2008 | Roscoe et al. | 709/226 |

FOREIGN PATENT DOCUMENTS

EP 1088444 A2 * 4/2001

OTHER PUBLICATIONS

Rui José et al.;The AROUND Architecture for Dynamic Location-Based Services;2003;Kluwer Academic; 8; 377-387.*

* cited by examiner

*Primary Examiner* — Evans Desrosiers
(74) *Attorney, Agent, or Firm* — Terrile, Cannatti, Chambers & Holland, LLP; Robert W. Holland

(57) ABSTRACT

Information handling system network addresses are managed based on the location of the information handling system. For example, a blade information handling system chassis has network addresses stored in persistent memory and associated with each of plural slots. A blade information handling system inserted in a slot receives network addresses associated with the slot from a chassis management controller. A baseboard management controller of the blade information handling system receives the network addresses and applies the network addresses to power up networking components to communicate over a network with the network addresses, such as MAC addresses or WWN addresses.

14 Claims, 5 Drawing Sheets

SYSTEM AND METHOD FOR ASSIGNING ADDRESSES TO INFORMATION HANDLING SYSTEMS

BACKGROUND OF THE INVENTION

1. Field of the Invention

The present invention relates in general to the field of information handling system networking, and more particularly to a system and method for assigning addresses to information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networked information handling systems provide support for many business and personal applications. Enterprises often network information handling systems to use common storage, to enhance communications between employees and to leverage the use of peripherals, such as common printers. Individuals commonly access a variety of networks using modems or wireless access points to retrieve news, track finances or communicate with e-mail and instant messages. Typically, behind each network is one or more server information handling systems that coordinate communication of information between network clients. Large enterprises will often dedicate rooms that support multiple server information handling systems with specialized cooling and power equipment. In some instances, multiple servers known as blades operate from a common chassis to conserve space while sharing cooling and power equipment. Large enterprise networks often have a variety of support organizations responsible for the deployment and maintenance of network resources, such as clients, servers, Ethernet local area network (LAN) connections and storage area networks (SANs). In such enterprise networks, deployment and maintenance tasks typically are closely coordinated. For example, if a server information handling system or IO module is replaced, MAC and WWN addresses assigned to the replaced systems have to be updated in a variety of security, deployment and networking databases in the LAN and SAN.

A variety of techniques have evolved that attempt to automate address assignments in response to information handling system server equipment changes. One solution uses an external switch to translate MAC addresses assigned to server information handling systems and related devices to external MAC addresses used by clients to communicate with the information handling system servers and related devices. Essentially, a switch is placed between the servers and clients so that a map incorporated with the switch is available to translate the MAC addresses associated with the servers to MAC addresses used by the network for the servers. This solution supports changes to server information handling systems that alter the server MAC addresses by reprogramming the map in the separate switch so that the replacement MAC addresses map to the MAC addresses used by the network. However, this solution requires a separate hardware device to support the map, which presents a single point of failure and requires reprogramming with each change to the server information handling systems.

SUMMARY OF THE INVENTION

Therefore a need has arisen for a system and method which maintains network addresses in the event of changes to hardware of the network.

In accordance with the present invention, a system and method are provided which substantially reduce the disadvantages and problems associated with previous methods and systems for maintaining network addresses in the event of changes to hardware of the network. Network addresses are stored at a location and assigned to support network communications of information handling systems based on the location of the information handling system. A pre-power manager of the information handling system retrieves network addresses associated with the location of the information handling system from persistent memory of the location and applies the network addresses to power up networking components of the information handling system to communicate through the network with the network addresses.

More specifically, a blade information handling system chassis has plural slots, each slot supporting operation of a blade information handling system. Persistent storage associated with the chassis stores network addresses for use by blade information handling systems inserted in the slots, such as MAC and WWN addresses. A chassis management controller interfaced with the persistent memory retrieves the addresses and provides the addresses associated with each slot to a baseboard management controller of a blade information handling system inserted in each slot, such as through a management bus of the chassis. The baseboard management controller applies the network addresses associated with its slot to power up networking components to communicate with the network addresses. The network addresses applied by the baseboard management controller are not saved to persistent memory so that the addresses remain associated with the location in the event that the blade information handling system is removed from the slot. In one embodiment, blade information handling systems removed from the chassis retain the same address by removing the address information from the persistent memory of the chassis and inserting the address information in persistent memory of another chassis to support the removed blade information handling system.

The present invention provides a number of important technical advantages. One example of an important technical advantage is that network addresses within a network structure are automatically maintained when server information handling systems or related devices are changed or replaced. Thus, during replacement of server equipment the security, network and deployment databases that coordinate operation of the network continue to operate with existing network addresses without added external devices, such as a switch having network mapping. By assigning addresses before each boot, server information handling systems power up prepared to support communications through traditional communication paths, such as Ethernet. By removing addresses at power down, inadvertent duplication of addresses is prevented due replacement of equipment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Associating network addresses to a location for use by an information handling system reduces complexities associated with replacing and moving information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
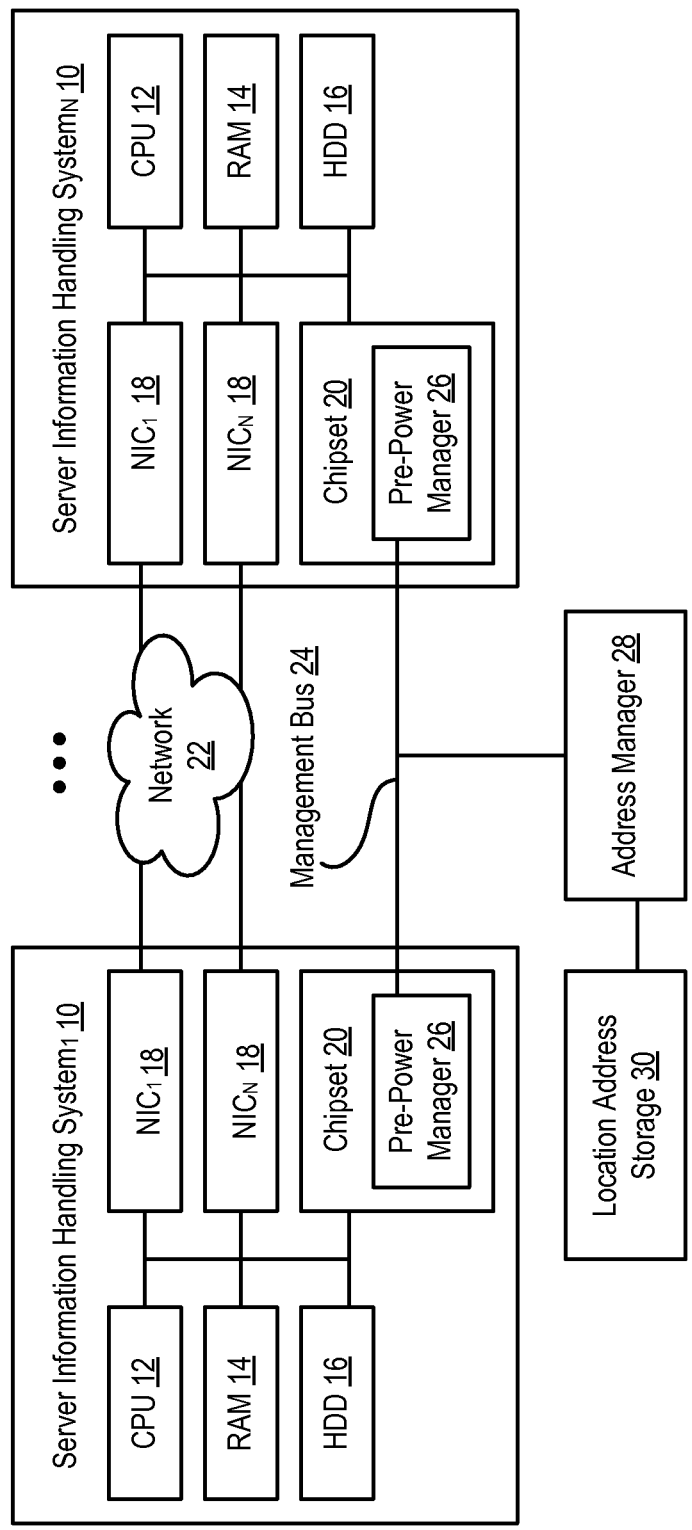
FIG. 1 depicts a block diagram of server information handling systems configured to apply location-based network addresses.

Referring now to FIG. 1, a block diagram depicts server information handling systems 10 configured to apply location-based network addresses. Server information handling systems 10 have plural processing components that cooperate to process information, such as a CPU 12, RAM 14, a hard disk drive 16, network interface cards 18 and a chipset 20. Plural network interface cards 18 coordinate the communication of information with a network 22, such as a local area network or a storage area network. A management bus 24, such as an I2C bus or SMBus, supports communication of management information through pre-power manager 26. For example, pre-power manager 26 operates with most processing components in a powered down state to support remote power-up, power-down and maintenance of server information handling systems 10 through management bus 24. An address manager 28 interfaces with pre-power manager 26 through management bus 24 in order to apply network addresses retrieved from local address storage 30. Local address storage 30 resides in persistent memory associated with a location, such as a physical spot in a server room or multi-server chassis. Each specific location has associated network addresses that are retrieved for use by information handling systems placed at the associated location. Address manager 28 provides the network addresses, such as MAC and WWN addresses, to pre-power manager 26 so that the addresses are available for networking components, such as NICs 18, at power up of the components. Pre-power manager 26 applies the network addresses at power up of the networking components so that network communications are supported with the network addresses retrieved from location address storage 30. Pre-power manager 26 applies the network addresses so that, if the information handling system is subsequently moved then the addresses will not remain on the information handling system. For example, the network addresses are stored in non-persistent memory of information handling system 10.

Figure 2:
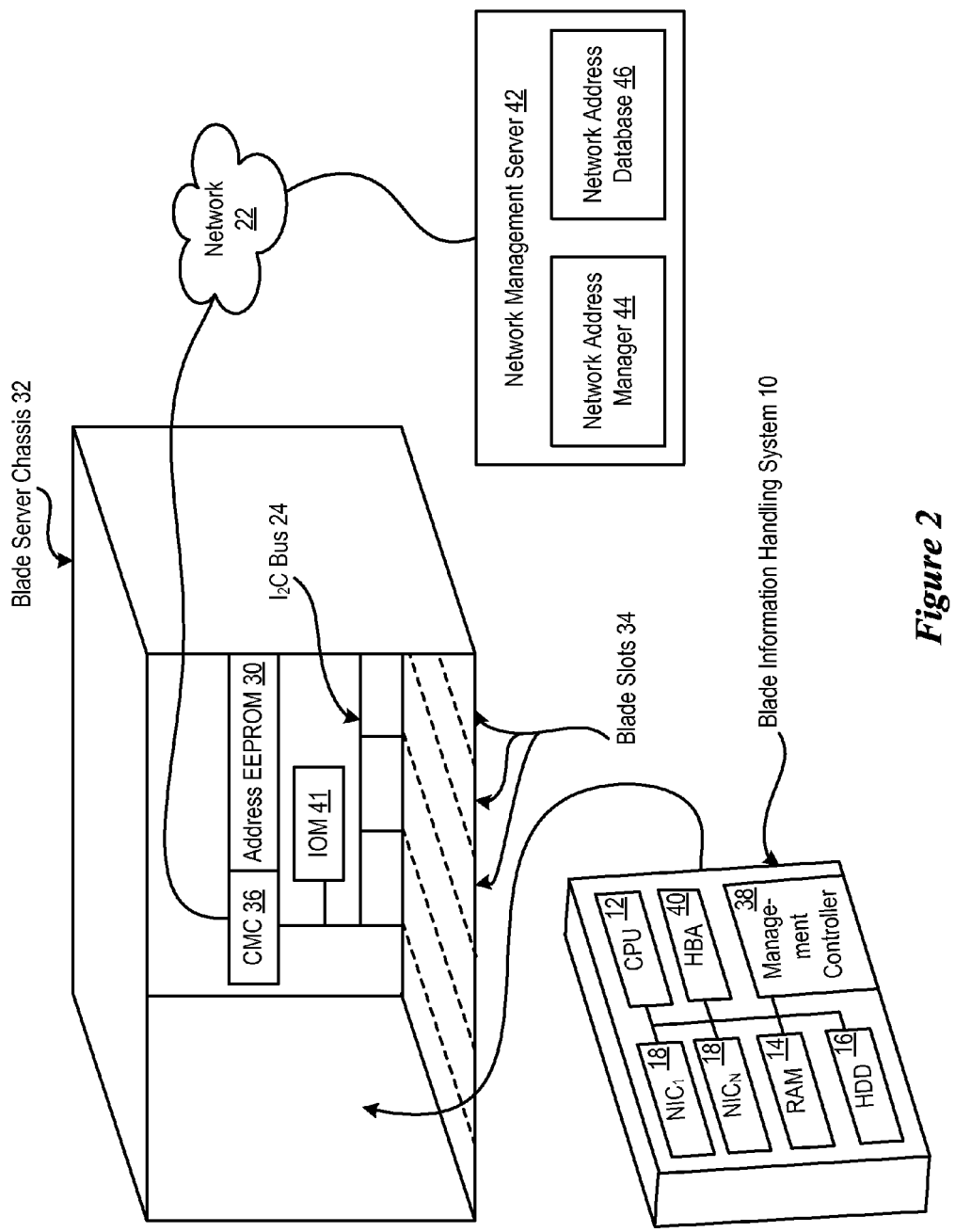
FIG. 2 depicts a block diagram of a blade server information handling system and chassis configured to apply network addresses based on the slot location used to support the information handling system.

Referring now to FIG. 2, a block diagram depicts a blade server information handling system 10 and a blade server chassis 32 configured to apply network addresses based on the slot location used to support the blade information handling system 10. Blade server chassis 32 has plural slots 34 each of which accept a blade information handling system. Blade server chassis 32 has a chassis management controller 36 that manages the operation of blade information handling systems 10 in slots 34 through a management bus 24. A management controller 38, such as a baseboard management controller (BMC) or integrated management controller (IMC), in each blade information handling system 10 communicates with chassis management controller 36 to manage operations such as powering up and powering down blade information handling system 10. With chassis management controller 36 and management controller 38 powered up and blade information handling system powered down, network addresses, such as MAC and WWN addresses, associated with a slot 34 are retrieved from address EEPROM 30 to enable configuration of network components, such as a NIC, LOM, and FC HBA 40, before power is applied to the network components. An IOM 41 located on chassis 32 also includes an Ethernet controller having a MAC address supported by information stored in EEPROM 30.

After the network addresses are available to the networking components for establishing network communication, chassis management controller 36 authorizes management controller 38 to power up blade information handling system 10 configured to communicate over network 22. The network addresses are stored in address EEPROM 30 in a number of ways. In one embodiment, address EEPROM 30 has unique MAC and WWN addresses registered with appropriate authorities and stored at manufacture of blade server chassis 32. In an alternative embodiment, a network management server 42 dynamically assigns network addresses with a network address manager 44 selecting from available addresses of a network address database 46. Chassis management controller 36 requests network addresses during its boot, such as by extending the DHCP protocol so that the MAC and WWN addresses are requested along with an IP address. Network addresses retrieved from network management server 42 may be stored in persistent memory of blade server chassis 32 for subsequent use.

Figure 3:
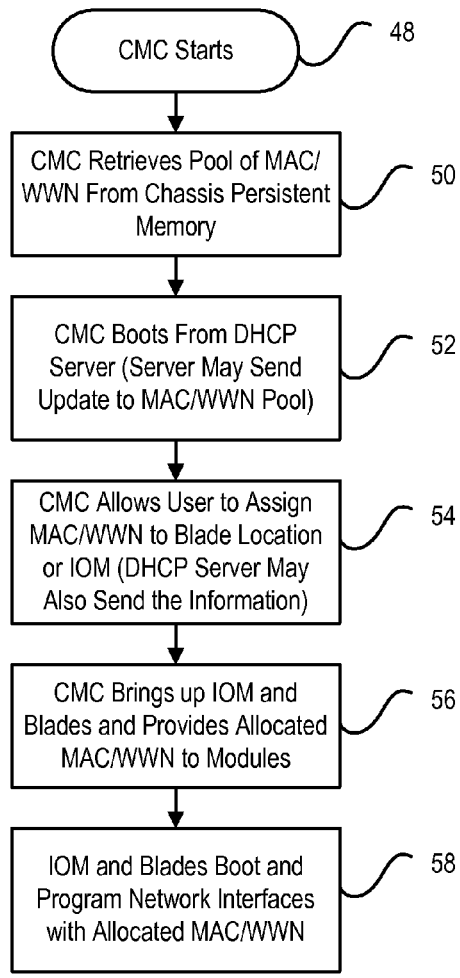
FIG. 3 depicts a flow diagram of a process for powering up blade information handling system network components to communicate with addresses managed by a chassis management controller.

Referring now to FIG. 3, a flow diagram depicts a process for powering up blade information handling system network components to communicate with addresses managed by a chassis management controller. At step 48, the chassis management controller starts. At step 50, the chassis management controller retrieves a pool of "soft" MAC and WWN addresses from the blade chassis persistent memory. At step 52, the chassis management controller boots from a DHCP server to establish network communication for the blade server chassis. In addition to retrieving an IP address, the chassis management controller may retrieve MAC and WWN addresses as a modification to the DHCP protocol. At step 54, the chassis management controller allows assignment of MAC and WWN addresses to blade or IOM locations of the blade server chassis. Alternatively, the DHCP server may send chassis slot assignment information. At step 56, the chassis management controller brings up the IOMs and blades and provides the allocated MAC and WWN addresses to each module. At step 58, the IOMs and blades boot and program the network interfaces with the allocated MAC and WWN addresses.

Figure 4:
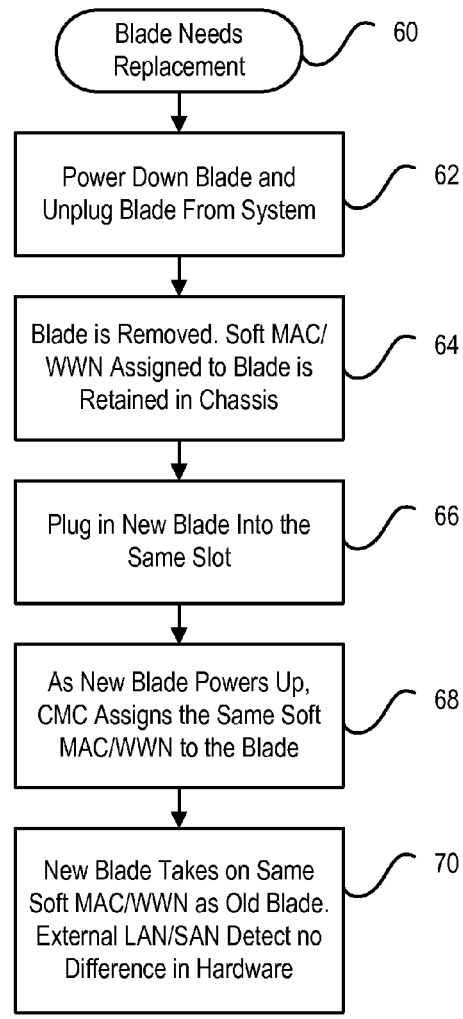
FIG. 4 depicts a flow diagram of a process for replacing a blade information handling system in a blade chassis slot.

Referring now to FIG. 4, a flow diagram depicts a process for replacing a blade information handling system in a blade chassis slot. The process begins at step 60 with a decision to replace a blade information handling system. At step 62, the blade information handling system is powered down and unplugged from the blade server chassis. At step 64, the blade information handling system is physically removed from its slot in the chassis, although the soft MAC and WWN addresses assigned to the blade are not retained in the blade but rather retained in the chassis. At step 66, the new blade information handling system is plugged into the chassis slot of the removed blade information handling system. At step 68, the new blade information handling system powers up and the chassis management controller assigns the MAC and WWN addresses associated with the slot and formerly used by the removed blade to the replacement blade information handling system. At step 70, the replacement blade information handling system applies the same MAC and WWN addresses as the removed blade so that the LAN or SAN detects no difference in hardware.

Figure 5:
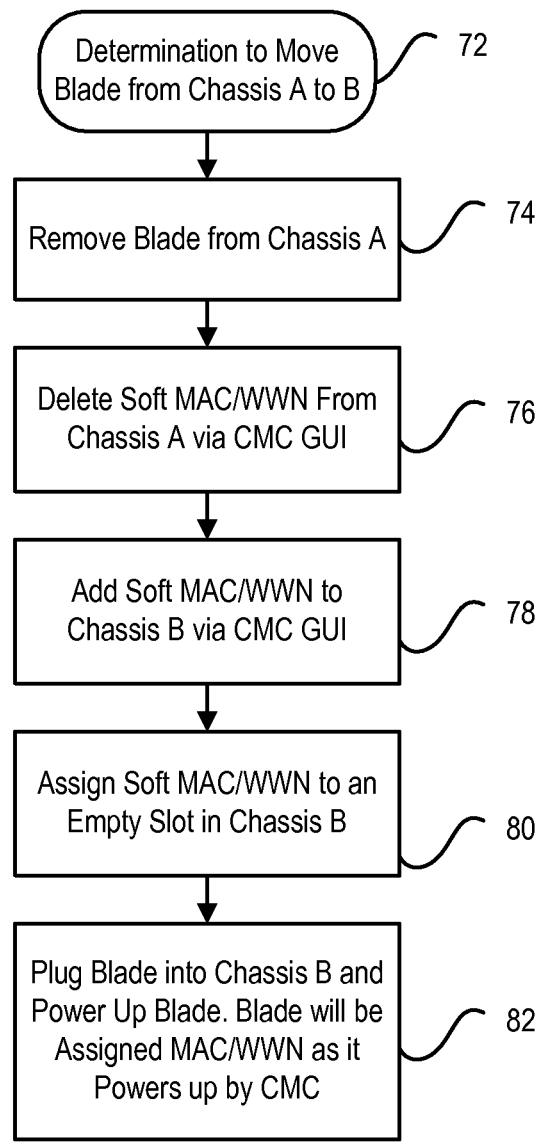
FIG. 5 depicts a flow diagram of a process for moving a blade information handling system from a first to a second chassis with the same network addresses used by the blade information handling system in each chassis.

Referring now to FIG. 5, a flow diagram depicts a process for moving a blade information handling system from a first to a second chassis with the same network addresses used by the blade information handling system in each chassis. The process starts at step 72 with a determination to move a blade information handling system from a first to a second chassis. At step 74, the blade information handling system is removed from the first chassis. At step 76 the soft MAC and WWN addresses associated with the blade information handling system are deleted from the first chassis. At step 78, the soft MAC and WWN addresses are added to the second chassis and, at step 80, associated with an empty slot in which the blade information handling system is to be inserted. At step 82, the blade information handling system is plugged into the selected chassis slot and powered up so that the MAC and WWN addresses previously used by the blade in the first chassis are once again used by the blade in the second chassis.

Figure 6:
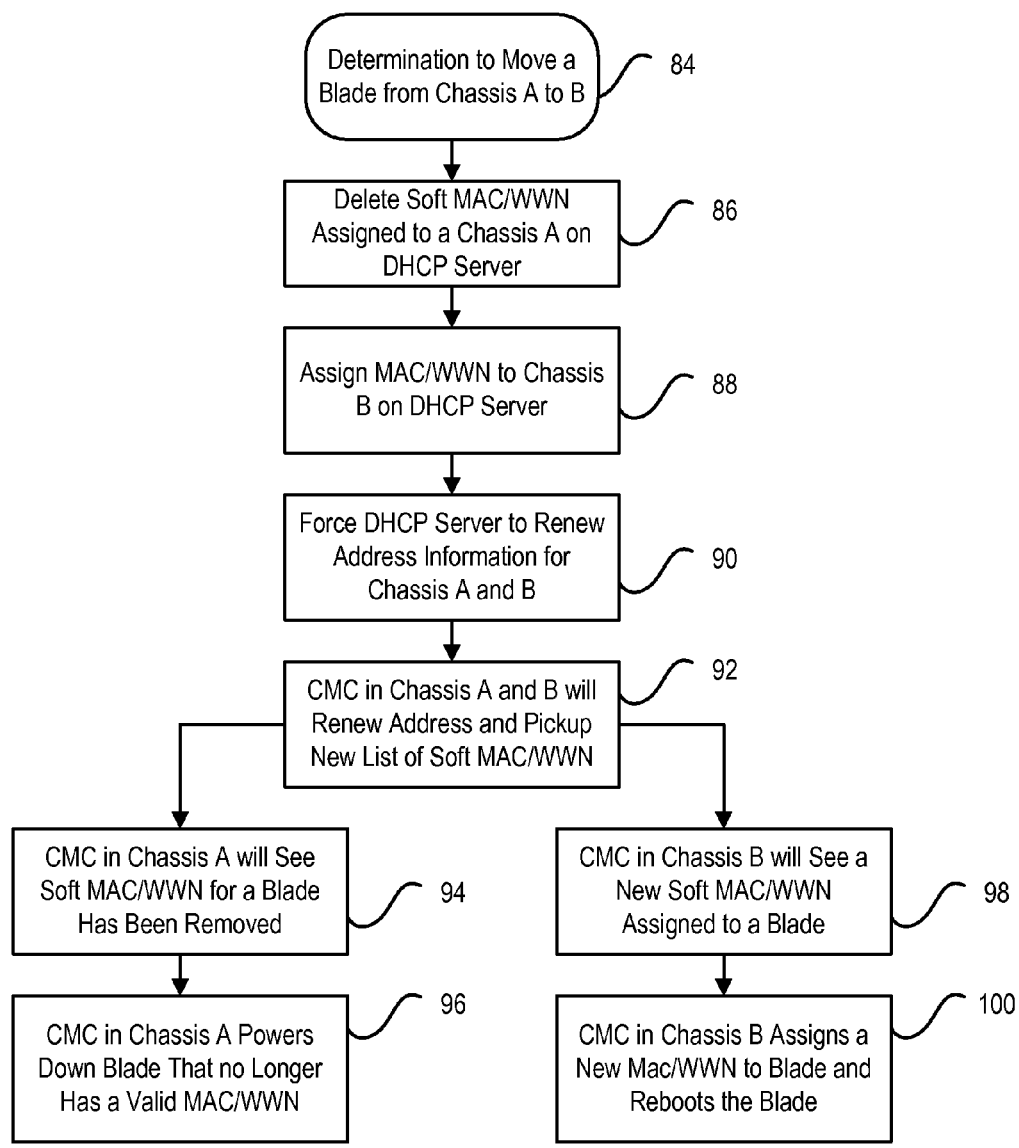
FIG. 6 depicts a flow diagram of a process for moving a blade information handling system to a remote location with dynamic address assignments.

Referring now to FIG. 6, a flow diagram depicts a process for moving a blade information handling system to a remote location with dynamic address assignments. At step 84 a determination is made to move a blade from a first to a second chassis. At step 86, the soft MAC and WWN addresses associated with the blade are deleted from assignment to the first chassis at the DHCP server. At step 88, the soft MAC and WWN addresses associated with the blade are added to the assignments of the second chassis at the DHCP server. At step 90, the DHCP server is forced to renew the address information at the first and second chassis. At step 92, the chassis management controllers of the first and second chassis renew the addresses and pick up the new list of soft MAC and WWN addresses from the DHCP server. At step 94, the chassis management controller in the first chassis sees that the soft MAC and WWN addresses for a blade are removed. At step 96, the chassis management controller of the first chassis down the blade that lacks valid MAC and WWN address information. At step 98, the chassis management controller of the second chassis sees the new soft MAC and WWN addresses assigned to the blade. At step 100, the chassis management controller in the second chassis assigns the new MAC and WWN addresses to the blade information handling system and reboots the blade to apply the addresses.

Although the present invention has been described in detail, it should be understood that various changes, substitutions and alterations can be made hereto without departing from the spirit and scope of the invention as defined by the appended claims.

What is claimed is:

1. An information handling system comprising:
a CPU operable to process information;
one or more network components interfaced with the CPU and operable to communicate information with one or more networks;
a pre-power manager in communication with the CPU, the pre-power manager operable to interface with an external management bus to retrieve one or more network addresses associated with a physical location of the information handling system and to apply the network addresses to the network components to power up the network components with the network addresses.

2. The information handling system of claim 1 wherein the network comprises a local area network and the network addresses comprise a MAC address associated with communication over the Ethernet network.

3. The information handling system of claim 1 wherein the physical location comprises a slot in a blade information handling system chassis.

4. The information handling system of claim 3 wherein the pre-power manager comprises a baseboard management controller.

5. The information handling system of claim 4 further comprising: persistent memory associated with the chassis and operable to store the network addresses; and a chassis management controller associated with the chassis, the chassis management controller operable to retrieve the network addresses from the persistent memory and to communicate the network addresses to the baseboard management controller.

6. The information handling system of claim 3 wherein the pre-power manager comprises an integrated management controller.

7. The information handling system of claim 1 wherein the pre-power manager is further operable to remove the network addresses from the network components at power down of the information handling system.

8. A method for managing network addresses associated with blade information handling systems housed in slots of a blade chassis, the method comprising: storing network addresses associated with the slots in persistent memory associated with the chassis; retrieving with a chassis management controller one or more of the network addresses associated with a predetermined slot;
communicating the retrieved network addresses from the chassis management controller to a baseboard management controller integrated in a blade information handling system coupled in the predetermined slot;
applying the network addresses to one or more networking components of the blade information handling system; and powering up the network components to establish network communications with the network addresses.

9. The method of claim 8 wherein applying the network addresses further comprises applying the network addresses with non-persistent memory so that the network addresses are deleted at power down of the blade information handling system.

10. The method of claim 8 wherein the network addresses comprise a MAC address.

11. A system for managing information handling system network addresses, the system comprising:
persistent storage associated with a chassis, the chassis having plural slots;
plural network addresses stored in the persistent storage, each network address associated with a slot; an address manager associated with the chassis and interfaced with the persistent storage, the address manager operable to retrieve one or more network addresses associated with a slot from the persistent storage and communicate the retrieved network addresses to an information handling system associated with the slot.

12. The system of claim 11 further comprising a pre-power manager associated with the information handling system and interfaced with the address manager, the pre-power manager operable to apply the network addresses for use at power-up of the information handling system.

13. The system of claim 12 wherein the address manager comprises a chassis management controller associated with a blade information handling system chassis and the pre-power manager comprises a baseboard management controller.

14. The system of claim 13 wherein the network addresses comprise a MAC address.

* * * * *